United States Patent [19]
de Jaeger et al.

[11] Patent Number: 5,132,389
[45] Date of Patent: Jul. 21, 1992

[54] POLYCONDENSATION OF IMPURE $P_2NOCL_5$ INTO UNCROSSLINKED POLY(DICHLOROPHOSPHAZENES) IN THE PRESENCE OF $PCL_5$

[75] Inventors: Roger de Jaeger, Chereng; Ghislaine D'Halluin, Hulluch; Guy Pagniez, Poey de l'Escar; Philippe Potin, Billere, all of France

[73] Assignee: Atochem, Puteaux, France

[21] Appl. No.: 601,300

[22] Filed: Oct. 22, 1990

[30] Foreign Application Priority Data

Oct. 20, 1989 [FR] France .................................. 89 13753

[51] Int. Cl.⁵ ........................ C08G 79/02; C01B 25/10
[52] U.S. Cl. .................................. 528/168; 423/300; 525/538
[58] Field of Search ........................ 423/300; 525/538; 528/168

[56] References Cited

U.S. PATENT DOCUMENTS 3,917,802  11/1975  Allcock et al. ...................... 423/300
4,693,876   9/1987  DeJaeger et al. ................... 423/300

*Primary Examiner*—Paul R. Michl
*Assistant Examiner*—Tae H. Yoon
*Attorney, Agent, or Firm*—Burns, Doane, Swecker & Mathis

[57] ABSTRACT

The polycondensation disrupting effects of the impurities in an impure N-dichlorophosphoryltrichlorophosphazene, $P_2NOCl_5$, or oligomer thereof, are avoided by polycondensing such impure $P_2NOCl_5$ into a high molecular weight uncrosslinked poly(dichlorophosphazene) in the presence of an effective impurity-inhibiting, polymerization-controlling amount of phosphorous pentachloride, $PCl_5$.

17 Claims, No Drawings

POLYCONDENSATION OF IMPURE P₂NOCL₅ INTO UNCROSSLINKED POLY(DICHLOROPHOSPHAZENES) IN THE PRESENCE OF PCL₅

BACKGROUND OF THE INVENTION

1. Field of the Invention

The present invention relates to avoiding the deleterious polycondensation disrupting effects of the impurities in an impure N-dichlorophosphoryltrichlorophosphazene of the formula:

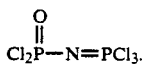

2. Description of the Prior Art

In its monomer form, N-(dichlorophosphoryl)trichlorophosphazene (abbreviated as $P_2NOCl_5$) is used for the preparation of poly(dichlorophosphazene) by a process described, for example, in French Patents 2,466,435 and 2,571,710, in accordance with the following general scheme:

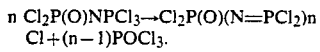

This preparation of poly(dichlorophosphazene) by polycondensation requires a $P_2NOCl_5$ of very high purity. Depending on the purity, it is possible to produce a poly(dichlorophosphazene) of more or less high molecular weight. In the event that the purity is wholly inadequate, a completely crosslinked polymer is obtained.

The impurities in $P_2NOCl_5$ are responsible for the following two adverse phenomena:

(i) they terminate the polymer chain growth at a certain level of molecular weight;

(ii) they induce reactions which interfere with the polycondensation and promote branching and interchain bridging to ultimately provide a crosslinked polymer that is virtually useless.

The quality of the $P_2NOCl_5$ can thus be evaluated in terms of its behavior, as a result of which very great differences in reactivity with respect to the polycondensation thereof, as a function of the conditions for the preparation of the $P_2NOCl_5$, are observed. Thus, the conditions indicated, for example, in French Patents 2,612,169, 2,612,171 and 2,606,396, influence the behavior of the $P_2NOCl_5$ during the polycondensation thereof. Accidental contamination can also interfere with such polycondensation and it has been observed, for example, that trace amounts of moisture can limit the molecular weight or cause crosslinking of the polycondensation product.

SUMMARY OF THE INVENTION

Accordingly, a major object of the present invention is the provision of a $P_2NOCl_5$, the polycondensation of which conspicuously avoids those disadvantages and drawbacks to date characterizing the state of this art.

Briefly, the present invention features avoiding the deleterious effects of the impurities in $P_2NOCl_5$ by appropriately associating said $P_2NOCl_5$ with $PCl_5$.

DETAILED DESCRIPTION OF THE PREFERRED EMBODIMENTS OF THE INVENTION

More particularly according to the present invention, by the expression "associating said $P_2NOCl_5$ with $PCl_5$" is intended the mere simultaneous presence of these two compounds without implying some type of reaction either between said compounds, or between the $PCl_5$ and one or any other of the impurities in the $P_2NOCl_5$.

Thus, the $PCl_5$ can be associated with $P_2NOCl_5$ at different times between the preparation of the $P_2NOCl_5$ itself and the polycondensation of such $P_2NOCl_5$. However, since, as soon as $PCl_5$ is introduced into the synthesis solution of $P_2NOCl_5$, some of it can be entrained by the evaporation of the solvent, it is preferably added after the crude $P_2NOCl_5$ has been concentrated.

$P_2NOCl_5$ can be prepared by the process described, for example, in U.S. Pat. No. 3,231,327 or French Patents 2,612,169 or 2,606,396. Upon introduction of $PCl_5$ into crude $P_2NOCl_5$, a favorable influence on the purity of the distilled $P_2NOCl_5$ and also on the yield of the distillation is observed. Upon completion of the distillation, the boiler typically contains several percent of oligomers. When the distillation is carried out in the presence of $PCl_5$, the formation of these oligomers is suppressed, which obviously has a positive effect on the yield.

The $PCl_5$ can also be added at the beginning or over the course of the polycondensation. Such polycondensation may be carried out, for example, by the technique described in French Patents 2,612,170 and 2,612,172, hereby expressly incorporated by reference. The addition during the polycondensation may permit controlling a polycondensation reaction which is otherwise proceeding unfavorably.

The polycondensation of $P_2NOCl_5$ entails two stages:

(i) a first stage, during which the release or evolution of $POCl_3$ is observed and during which short polymer chains are formed (this stage can last from 3 to 10 hours at 280° C.);

(ii) a second stage, during which the molecular weight increases from the level of oligomers to high molecular weights, which occurs without any visible liberation of $POCl_3$ (this stage can last from 10 to 40 hours at 280° C.).

By measuring the rate of release of $POCl_3$, it is possible to approximately predict the ultimate nature of the polycondensation product over the course of the polycondensation. If the rate is very high (>1% of conversion per minute at 260°C.), it has been determined that the polycondensation will produce a crosslinked polymer. Under these conditions, it is possible to correct this deviant reactivity by adding the $PCl_5$ in the course of the first stage.

This addition provides an immediate slowing down of the release of $POCl_3$, and the polycondensation can be carried out under conventional conditions up to a high level of molecular weight without any crosslinking.

In certain polycondensations, probably due to the effect of impurities serving as chain-restricting agents, the increase in the molecular weight terminates at levels which are not sufficiently high. In this case, the addition of $PCl_5$ enables restarting the polycondensation and attaining the desired ultimate level of molecular weight.

When the $PCl_5$ is added to the crude $P_2NOCl_5$, it is typically not necessary to exceed an amount of 20% (by weight of $PCl_5$, relative to the weight of crude $P_2NOCl_5$). Advantageously, this amount ranges from 0.1 to 5%. When $PCl_5$ is associated with $P_2NOCl_5$ which is undergoing polycondensation, very large amounts of $PCl_5$ must not be employed, in order to avoid the formation of $P_3NCl_{12}$ according to the following reaction scheme:

$$P_2NOCl_5 + 2PCl_5 \rightarrow (Cl_3PNPCl_3)^+ PCl_6^- + POCl_3$$

as the presence of any $P_3NCl_{12}$ thus formed in the polycondensation reaction product only results in a polymer of low molecular weight. Accordingly, the amount of $PCl_5$ introduced must be limited if it is desired to attain high molecular weights. Typically, the upper limit of such amount is about 2% by weight. Advantageously, such amount ranges from 0.05 to 1% by weight.

The present invention also features the $P_2NOCl_5$ thus treated, the association of $P_2NOCl_5$ with $PCl_5$, as well as the polycondensation products of $P_2NOCl_5$ formed in the presence of $PCl_5$.

In order to further illustrate the present invention and the advantages thereof, the following specific examples are given, it being understood that same are intended only as illustrative and in nowise limitative.

COMPARATIVE EXAMPLE 1

2.709 g of crude $P_2NOCl_5$, prepared by the process described in U.S. Pat. No. 3,231,327, were introduced into the boiler of a distillation apparatus equipped with a packed column and a column head with controlled reflux.

The product was distilled at 102°C. under 0.5 torr at the head and 125°C. at the boiler level, at a reflux ratio of 5:1 during distillation of the top fraction and 1:1 during the distillation of the tail fraction.

Based on the initial feed material, the following results were obtained:

| (a) Top product | 348.23 g or 12.85% |
|---|---|
| (b) Principal fraction | 2155.02 g or 79.55% |
| (c) Residue in the boiler | 57.94 g or 2.14% |
| (d) Volatile components condensed in a liquid nitrogen trap | 135.83 g or 5.01%. |

The top fraction had a deep yellow color, and the principal fraction was greyish.

EXAMPLE 2

1,867 g of the same batch of crude $P_2NOCl_5$ as that used in Example 1 were introduced into the boiler, together with 72.51 g of $PCl_5$. The mixture was maintained at 130° C. for 2 hours with stirring, and then distilled under conditions identical to those of Example 1.

The top fraction was divided into 3 fractions. The results of the distillation were as follows, relative to the entire initial feed material:

| (a) Top fraction 1 | 66.64 g or 3.42% |
|---|---|
| (b) Top fraction 2 | 117.35 g or 6.02% (of which 0.038 g was $PCl_5$) |
| (c) Top fraction 3 | 138.62 g or 7.11% (no $PCl_5$) |
| (d) Principal fraction | 1373.46 g or 70.49% |
| (e) Residue in the boiler | 12 g or 0.61% |
| (f) Volatile components | 195.03 g or 10.00% (of which 62 g were $PCl_5$). |

Top fraction 1 had a light yellow color, top fractions 2 and 3, as well as the principal fraction, were completely colorless.

COMPARATIVE EXAMPLE 3

A polycondensation was carried out in a 500-ml reactor heated by circulating oil and equipped with an anchor stirrer, a nitrogen inlet, an inlet for the reactants, an outlet for vaporized $POCl_3$, comprising an ascending condenser heated to 140° C., and a downstream descending condenser for condensing $POCl_3$ vapors and a graduated received for collecting the liquid $POCl_3$. The entire apparatus was pressurized under nitrogen by means of a water seal.

138.47 g (0.514 mole) of $P_2NOCl_5$ emanating from the distillation described in Example 1 were introduced into the reactor and heated to 265° C. The release of $POCl_3$ was observed, whose rate at a conversion between 20% and 60% was 1.25 %/min. After 2.07 hours of polycondensation, the conversion reached its upper limit of 87.28%. The reactor was flushed with nitrogen for 20 minutes, and 95.3% of the theoretical amount of $POCl_3$ was recovered. 97.32 g of trichlorodiphenyl were then introduced. The temperature of the polycondensation product was controlled at 280° C. After 8.37 hours under these conditions, a sample was withdrawn and its inherent viscosity was measured, which was:

THF*
$[\eta] = 23.54$ ml/g
30° C.

*In all experiments, 0.1% by weight of LiBr and 0.2% by volume of trimethylchlorosilane were added to the THF.

The polycondensation was continued, but after 8.83 hours the polycondensation product became viscous, could no longer be stirred, and became completely insoluble in benzene.

EXAMPLE 4

278 g (1.032 mole) of $P_2NOCl_5$ emanating from the distillation described in Example 2 were introduced into the same apparatus. The reaction mixture was heated to 274° C. Under these conditions, the rate of release of $POCl_3$, measured at a conversion ranging from 20% and 60%, was 0.39 %/min.

After 12 hours of polycondensation, the conversion reached its upper limit at 93 1%. The reactor was flushed with nitrogen for 45 minutes, and 95.3% of the theoretical amount of $POCl_3$ was recovered. 259.13 g of trichlorodiphenyl were then introduced. The temperature of the polycondensation product was controlled at 280° C. A series of samples was withdrawn at different times and the intrinsic viscosity of each was measured. After an overall polycondensation time of 50 hours, this viscosity reached its upper limit at:

THF
$[\eta] = 54$ ml/g
30° C.

EXAMPLE 5

173.9 g (0.645 mole) of $P_2NOCl_5$ emanating from the distillation described in Example 1 and 0.763 g of $PCl_5$ (0.56 mol %) were introduced into the same apparatus as in Example 3. The reaction mixture was heated at 160° C. for 3.30 hours. The temperature of the mixture was then controlled at 274° C. Under these conditions, the rate of release of POCl$_3$, measured at a conversion ranging from 20% to 60%, was 0.67 %/min.

After 5.15 hours of polycondensation, the conversion reached its upper limit at 96.2%. The reactor was flushed with nitrogen for 15 minutes, and 98.8% of the theoretical amount of POCl$_{13}$ was recovered. 162.77 g of trichlorodiphenyl were then introduced. The temperature of the polycondensation product was controlled at 280° C. A series of samples was withdrawn at different times and the intrinsic viscosity of each was measured.

After an overall polycondensation time of 52.4 hours, this viscosity reached its upper limit at:
THF
[η] = 50.4 ml/g
30° C.

EXAMPLE 6

172 g (0.638 mole) of P$_2$NOCl$_5$ emanating from the distillation described in Example 1 were introduced into the same apparatus as that described in Example 3. The temperature of the mixture was controlled at 270° C. Under these conditions, the rate of release of POCl$_3$, measured at a conversion ranging from 10% to 35%, was 2.46 %/min. After 0.30 hour of polycondensation at a conversion of 35%, 1.03 g of PCl$_5$ (0.77 mol %) was introduced into the polycondensation mixture. The rate of release of POCl$_3$ decreased immediately. This rate, measured at a conversion ranging from 35% to 60%, was 0.52 %/min. After 4 hours of polycondensation, the conversion reached its upper limit of 87.8%. The reactor was flushed with nitrogen for 15 minutes, and 91.9% of the theoretical amount of POCl$_3$ was recovered. 158.3 g of trichlorodiphenyl were then introduced. The temperature of the polycondensation product was controlled at 280° C. A series of samples was withdrawn at different times, and the intrinsic viscosity of each was measured. After an overall polycondensation time of 50 hours, this viscosity reached an upper limit at:
THF
[η] = 48.7 ml/g
30° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a high molecular weight uncrosslinked poly(dichlorophosphazene), comprising polycondensing an impure N-dichlorophosphoryltrichlorophosphazene, P$_2$NOCl$_5$, or oligomer thereof, in the presence of an effective impurity-inhibiting, polymerization controlling amount of phosphorous pentachloride, PCl$_5$.

2. The process as defined by claim 1, said amount of PCl$_5$ not exceeding 20% by weight of said P$_2$NOCl$_5$.

3. The process as defined by claim 2, said amount of PCl$_5$ ranging from 0.1% to 5% by weight of said P$_2$NOCl$_5$.

4. The process as defined by claim 2, said amount of PCl$_5$ not exceeding 2% by weight of said P$_2$NOCl$_5$.

5. The process as defined by claim 1, said impure P$_2$NOCl$_5$ comprising crude undistilled P$_2$NOCl$_5$.

6. The process as defined by claim 2, said amount of PCl$_5$ ranging from 0.05% to 1% by weight of said P$_2$NOCl$_5$.

7. The process as defined by claim 1, said impure P$_2$NOCl$_5$ comprising a synthesis solution thereof.

8. A composition of matter comprising an impure N-dichlorophosphoryltrichlorophosphazene, P$_2$NOCl$_5$, or oligomer thereof, and an effective impurity-inhibiting, P$_2$NOCl$_5$ polymerization-controlling amount of phosphorus pentachloride, PCl$_5$.

9. The composition of matter as defined by claim 8, said amount of PCl$_5$ not exceeding 20% by weight of said P$_2$NOCl$_5$.

10. The composition of matter as defined by claim 9, said amount of PCl$_5$ ranging from 0.1% to 5% by weight of said P$_2$NOCl$_5$.

11. The composition of matter as defined by claim 10, said amount of PCl$_5$ not exceeding 2% by weight of said P$_2$NOCl$_5$.

12. The composition of matter as defined by claim 8, said impure P$_2$NOCl$_5$ comprising crude undistilled P$_2$NOCl$_5$.

13. The composition of matter as defined by claim 8, said amount of PCl$_5$ ranging from 0.05% to 1% by weight of said P$_2$NOCl$_5$.

14. The composition of matter as defined by claim 8, said impure P$_2$NOCl$_5$ comprising a synthesis solution thereof.

15. A process for avoiding the polycondensation disrupting influence of the impurities in an impure N-dichlorophosphoryltrichlorophosphazene, P$_2$NOCl$_5$, or oligomer thereof, comprising associating said impure P$_2$NOCl$_5$ with an effective impurity-inhibiting, polymerization-controlling amount of phosphorus pentachloride, PCL$_5$.

16. The uncrosslinked poly(dichlorophosphazene) prepared by the process as defined by claim 1.

17. A process for purifying a crude impure N-dichlorophosphoryltrichlorophosphazene, P$_2$NOCl$_5$, comprising distilling said impure P$_2$NOCl$_5$ in the presence of an effective impurity-inhibiting amount of phosphorus pentachloride, PCL$_5$.

* * * * *